(12) United States Patent
Lee et al.

(10) Patent No.: US 8,134,654 B2
(45) Date of Patent: Mar. 13, 2012

(54) LIQUID CRYSTAL DISPLAY AND METHOD FOR MANUFACTURING THE SAME

(75) Inventors: Sang-Hun Lee, Suwon-si (KR); Chul Huh, Yongin-si (KR); Se-Hwan Yu, Asan-si (KR); Gwan-Soo Kim, Cheonan-si (KR); Sun-Young Chang, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 442 days.

(21) Appl. No.: 12/487,210

(22) Filed: Jun. 18, 2009

(65) Prior Publication Data

US 2010/0045907 A1  Feb. 25, 2010

(30) Foreign Application Priority Data

Aug. 20, 2008  (KR) .................. 10-2008-0081355

(51) Int. Cl.
*G02F 1/136* (2006.01)
*G02F 1/1333* (2006.01)
*H01J 9/00* (2006.01)

(52) U.S. Cl. ............... 349/44; 349/110; 349/111; 445/4
(58) Field of Classification Search .................... 349/44, 349/110, 111; 445/4
See application file for complete search history.

(56) References Cited

U.S. PATENT DOCUMENTS

| | | | |
|---|---|---|---|
| 2006/0232728 A1* | 10/2006 | Kim | 349/106 |
| 2006/0290874 A1* | 12/2006 | Yoon et al. | 349/158 |
| 2009/0261333 A1* | 10/2009 | Chang et al. | 257/59 |

FOREIGN PATENT DOCUMENTS

| | | | |
|---|---|---|---|
| JP | 09197434 A | 7/1997 | |
| JP | 10282464 A | 10/1998 | |
| JP | 2000356858 A | 12/2000 | |
| JP | 2002303859 A | 10/2002 | |
| JP | 2003043939 A | 2/2003 | |
| JP | 2008032886 A | 2/2008 | |
| JP | 2008040107 A | 2/2008 | |
| KR | 1020010015479 A | 2/2001 | |
| KR | 1020030011985 A | 2/2003 | |
| KR | 1020030028955 A | 4/2003 | |
| KR | 1020030075767 A | 9/2003 | |
| KR | 1020040055005 A | 6/2004 | |
| KR | 1020060125138 A | 12/2006 | |
| KR | 1020070033073 A | 3/2007 | |

* cited by examiner

*Primary Examiner* — Mike Qi
(74) *Attorney, Agent, or Firm* — Cantor Colburn LLP

(57) ABSTRACT

A manufacturing method of an LCD includes forming an align key including metal on a first substrate, coating a light blocking layer overlapping the align key, transmitting an infrared ray thought the light blocking layer on the align key, recognizing the align key by the transmitting the infrared ray to align key and the light blocking layer, and forming a light blocking member by exposing and developing the light blocking layer.

14 Claims, 5 Drawing Sheets

LIQUID CRYSTAL DISPLAY AND METHOD FOR MANUFACTURING THE SAME

This application claims priority to and the benefit of Korean Patent Application No. 10-2008-0081355 filed on Aug. 20, 2008, and all the benefits accruing therefrom under 35 U.S.C. §119, the entire contents of which are incorporated herein by reference.

BACKGROUND OF THE INVENTION (a) Field of the Invention

The present invention relates to a liquid crystal display.

(b) Description of the Related Art

A liquid crystal display ("LCD") is one type of flat panel displays that are widely used. The LCD includes two display panels on which electrodes are formed, and a liquid crystal layer inserted between the two display panels. The LCD rearranges liquid crystal molecules of the liquid crystal layer by applying a voltage to the electrodes, thereby adjusting an amount of transmitted light.

An LCD may have a structure in which field generating electrodes are provided on each of two display panels among liquid crystal displays. The LCD may further have a structure in which a plurality of TFTs and pixel electrodes are arranged in a matrix form on one display panel (hereinafter referred to as a "TFT array panel"), and red, green, and blue color filters are formed on the other display panel (hereinafter referred to as a "common electrode panel") of which an entire surface may be covered with a common electrode.

BRIEF SUMMARY OF THE INVENTION

Since an LCD may include a pixel electrode and a color filter respectively disposed on different display panels, there are technical challenges in manufacturing the LCD. For example, it is difficult for the pixel electrode and the color filter to be accurately aligned and thus an alignment error may occur. To address the technical challenges in manufacturing the LCD, a structure of the LCD in which the color filter and a light blocking member, which is referred to as a black matrix, are disposed on a same array panel as a pixel electrode may be used.

When the structure of an LCD is formed by performing an exposure and developing process in an LCD manufacturing process, an align key may be required to determine a precise exposure location. When the exposing process is performed to form the light blocking member, it may difficult to recognize the align key due to material (e.g., light blocking, light transmitting) characteristics of the light blocking member. In an LCD manufacturing process, the align key can be more easily recognized after removing a light blocking layer on a portion of the align key, such as by using a laser. However, process time is increased because the light blocking layer on the align key being removed requires an additional step to the LCD manufacturing process, and the align key under the light blocking layer may be undesirably damaged as a result of the removal of the light blocking layer, such as with the laser. Further, the eliminated light blocking layer may become an undesirably foreign particle in a substrate of the LCD.

An exemplary embodiment provides a method to recognize an align key with relative ease when forming a light blocking member in an LCD structure in which a color filter and the light blocking member are formed on the same array panel as a pixel electrode.

An exemplary embodiment of a manufacturing method of a liquid crystal layer ("LCD") includes forming an align key including metal on a substrate, coating a light blocking layer overlapping the align key, transmitting an infrared ray thought the light blocking layer on the align key, recognizing the align key by transmitting the infrared ray to the align key and the light blocking layer, and forming a light blocking member by exposing and developing the light blocking layer.

A wavelength of the infrared ray may be about 1000 nanometers (nm) or more.

Infrared ray transmittance of the light blocking layer may be greater than about 60% and optical density of the light blocking layer is greater than about 3.0.

The light blocking layer may include carbon black at less than about 7 wt %.

The light blocking layer may include an organic black material.

A wavelength of the infrared ray may be about 1500 nanometers (nm) or more.

An exemplary embodiment of a manufacturing method of a liquid crystal layer ("LCD") includes forming the light blocking layer including carbon black at less than about 7 wt % on a first substrate.

An exemplary embodiment of an LCD includes a substrate and a light blocking member. The infrared ray transmittance of the light blocking member is greater than about 60% and optical density of greater than about 3.0.

A metal layer is under the light blocking member.

The light blocking member may contain carbon black at less than about 7 wt %.

The light blocking member may include an organic black material.

The light blocking member includes a perylene black or an aniline black.

A wavelength of the infrared ray may be about 1000 nanometers (nm) or more.

A wavelength of the infrared ray may be about 1500 nanometers (nm) or more.

In an exemplary embodiment, process time can be reduced by allowing recognition of an align key to be relatively easy when forming a light blocking member in an LCD structure in which a color filter and the light blocking member are formed on the same array panel as a pixel electrode.

DETAILED DESCRIPTION OF THE INVENTION

Figure 1:
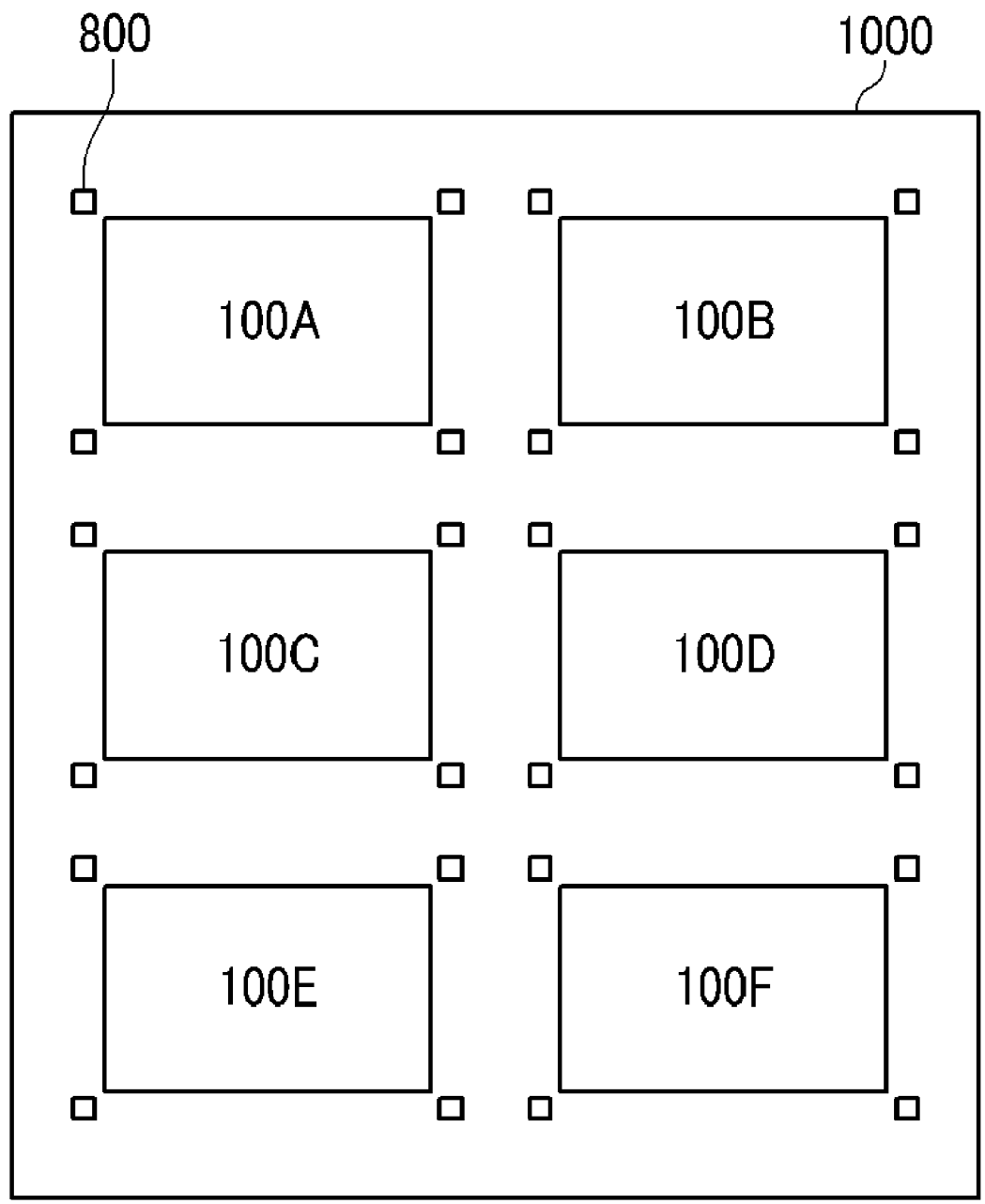
FIG. 1 is a top plan view illustrating an exemplary embodiment of a mother substrate of a thin film transistor ("TFT") according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a liquid crystal display ("LCD") according to the present invention will be described with reference to FIG. 1 to FIG. 3.

Figure 2:
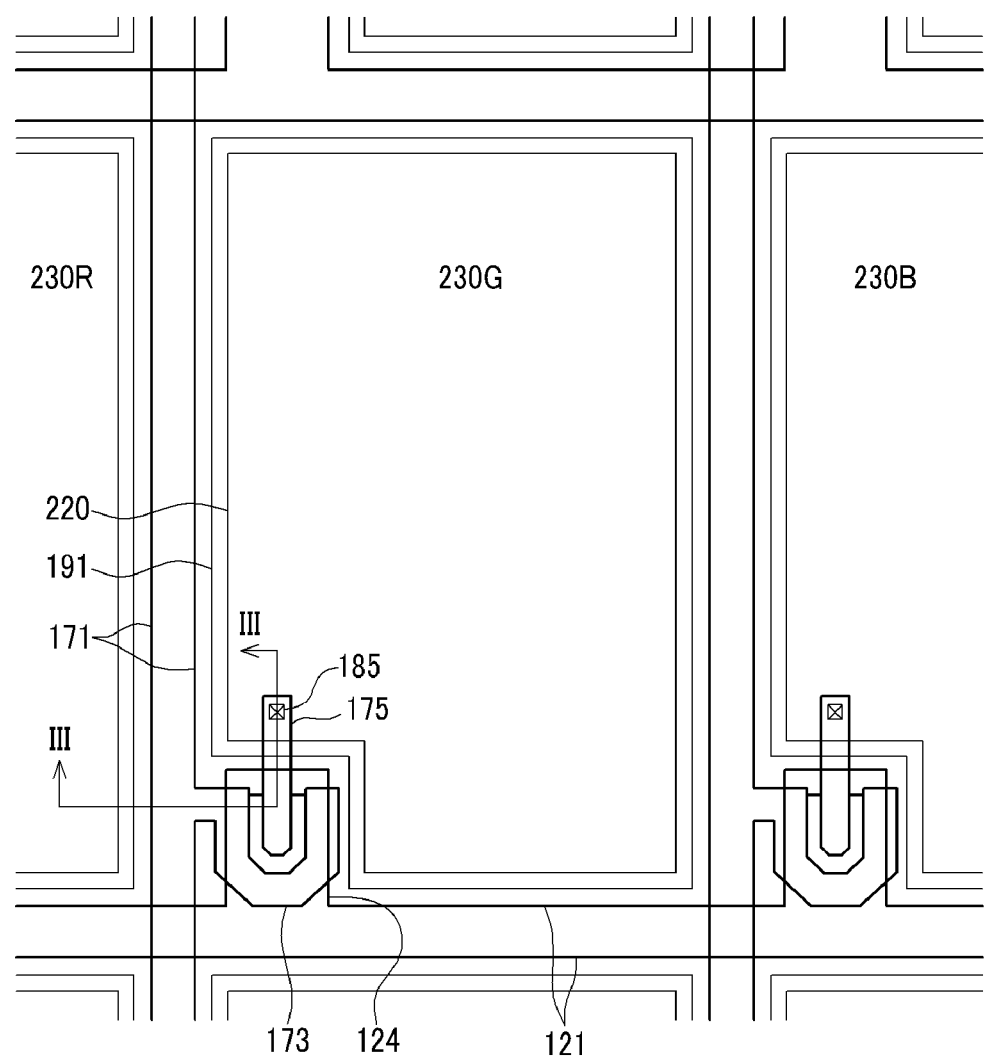
FIG. 2 is a layout view of an exemplary embodiment of a liquid crystal display ("LCD") according to the present invention.
Figure 3:
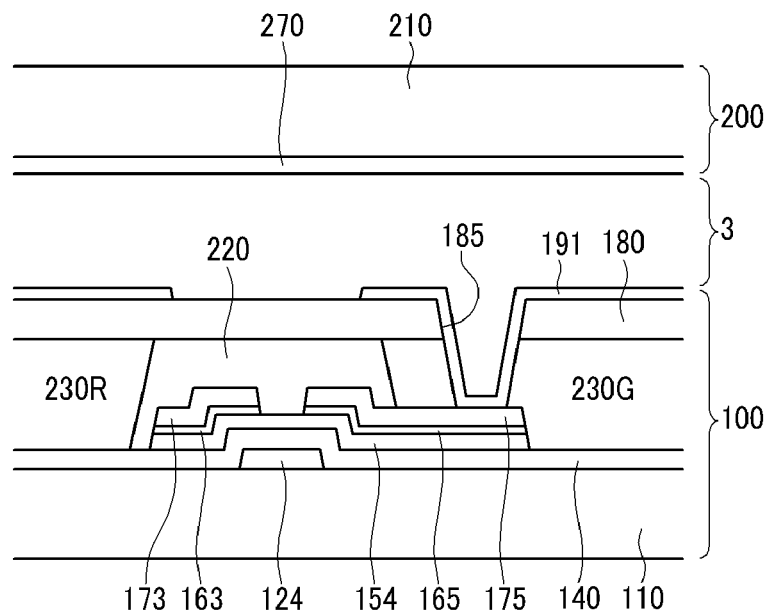
FIG. 3 is a cross-sectional view of the LCD of FIG. 2, taken along line III-III.

FIG. 1 is a top plan view illustrating an exemplary embodiment of a mother substrate of a thin film transistor ("TFT") according to the present invention, FIG. 2 is an exemplary embodiment of a layout view of the LCD according to the present invention, and FIG. 3 is a cross-sectional view of the LCD along line III-III of FIG. 2 according to the present invention.

As shown in FIG. 1, a plurality of thin film transistor (TFT) array panels 100A, 100B, 100C, 100D, 100E, and 100F are disposed on a TFT array panel mother (e.g., base) substrate 1000. While a number of the TFT array panels 100A-100F is shown as being six in FIG. 1, alternative embodiments may include more or less than six as is suitable for a manufacturing process of a TFT panel.

An align key 800 is disposed on the TFT array panel mother substrate 1000 at an edge portion of each of the respective TFT array panels 100A, 100B, 100C, 100D, 100E, and 100F. Such an align key 800 determines a precise exposure location when performing an exposure process among manufacturing processes of the TFT array panels 100A, 100B, 100C, 100D, 100E, and 100F.

A plurality of the align key 800 may be disposed outside a periphery of each of the TFT array panels 100A, 100B, 100C, 100D, 100E, and 100F. As illustrated in FIG. 1, an align key 800 may be positioned directly adjacent to each corner of the edge portion of a respective TFT array panel. While a number of the align key 800 is shown as being four for every TFT array panel in FIG. 1, alternative embodiments may include more or less than four as is suitable for the manufacturing process of the TFT panels. A plurality of the align key 800 may be substantially linearly aligned in both a first direction (e.g., vertical in FIG. 1) and a second direction (e.g., horizontal) perpendicular to the first direction on the base substrate, but the illustrated configuration is not limited thereto.

As shown in FIG. 2 and FIG. 3, an exemplary embodiment of the LCD according to the present invention includes a lower TFT array panel 100, an upper common electrode panel 200 facing the TFT array panel 100, and a liquid crystal layer 3 interposed between the lower and upper panels 100 and 200.

The TFT 100 will be described with reference to FIGS. 2 and 3.

A plurality of gate lines 121 including a gate electrode 124 is disposed on a substrate 110 of the TFT array panel 100. A gate insulating layer 140, a plurality of semiconductors 154, a plurality of ohmic contacts 163 and 165, a plurality of data lines 171, and a plurality of drain electrodes 175 are sequentially disposed on the plurality of gate lines 121 in a direction away from the first substrate 110. In an exemplary embodiment, the first substrate 110 may include an insulating material, such as glass or plastic.

The gate lines 121 transmit a gate signal, and substantially extend in the horizontal direction.

The data lines 171 transmit a data signal, and substantially extend in the vertical direction such that the data lines 171 cross the gate lines 121. Each data line 171 includes a plurality of source electrodes 173 extending toward the gate electrode 124. As illustrated in the plan view of FIG. 2, the source electrode 173 extends in the horizontal direction from a main portion of the data line 171 toward the gate electrode 124. The drain electrodes 175 are disposed separated from the data lines 171, and are disposed opposing the source electrodes 173 with respect to the gate electrode 124, as shown in FIGS. 2 and 3. A portion of both the source electrode 173 and the drain electrode 175 overlap a portion of the gate electrode 124.

As illustrated in FIG. 3, the semiconductors 154 are disposed on the gate electrode 124, and the ohmic contacts 163 and 165 are disposed only between the data lines 171 and the drain electrodes 175, so as to reduce contact resistance therebetween.

In an exemplary embodiment, one gate electrode 124, one source electrode 173, and one drain electrode 175 collectively form one TFT together with the semiconductor 154. A channel of the TFT is defined by the semiconductor 154 disposed between the source electrode 173 and the drain electrode 175, as shown in FIGS. 2 and 3.

A light blocking member 220 is disposed on the gate lines 121 and the data lines 171. A plurality of color filters 230R, 230G, and 230B are disposed in a pixel area partitioned by the light blocking member 220. The light blocking member 220 may include portions extended substantially in the vertical and the horizontal directions, and a stepped portion disposed where a TFT including a gate electrode 124, a source electrode 173, a drain electrode 175 and the semiconductor 154 are disposed. The stepped portion extends from both a vertical and a horizontal portion of the light blocking member 220.

The light blocking member 220 may overlap an entire of the data lines 171, the source electrodes 173 and the gate electrode 124, while overlapping only a portion of the drain electrodes 175, ohmic contacts 165 and the semiconductors 154.

In an exemplary embodiment, the light blocking member 220 includes carbon black at less than about 7 wt %, or may include only an organic material, such as perylene black or aniline black rather than the carbon black. The light blocking member 220 may have infrared ray transmittance of about 60% or more and optical density of the light blocking member 220 is greater than about 3.0. A wavelength of the infrared ray may be greater than about 1000 nanometers (nm), and more preferably, the wavelength of the infrared ray may be greater than about 1500 nanometers (nm).

Referring again to FIG. 3, a passivation layer 180 is disposed directly on the color filters 230R, 230G, and 230B. A contact hole 185 exposing the drain electrode 175 is disposed completely through the passivation layer 180 and the color filters 230R, 230G, and 230B.

A pixel electrode 191 is disposed directly on the passivation layer 180 and contacts the color filters 230R, 230G, and 230B exposed in the contact hole 185. The pixel electrode 191 is electrically connected to the drain electrode 175 through the contact hole 185.

Referring again to FIGS. 2 and 3, the common electrode panel 200 faces the TFT array panel 100. The common electrode panel 200 includes a substrate 210 and a common electrode 270 disposed on the substrate 210. In an alternative embodiment, the common electrode 270 may be disposed on the TFT array panel 100.

The liquid crystal layer 3 is disposed between the common electrode panel 200 and the TFT array panel 100.

An exemplary embodiment of a method for manufacturing the LCD of FIG. 2 and FIG. 3 will be described with reference to FIG. 4 to FIG. 7.

FIG. 4 to FIG. 7 are cross-sectional views showing an exemplary embodiment of a manufacturing method of the LCD of FIG. 2 and FIG. 3.

Figure 4:
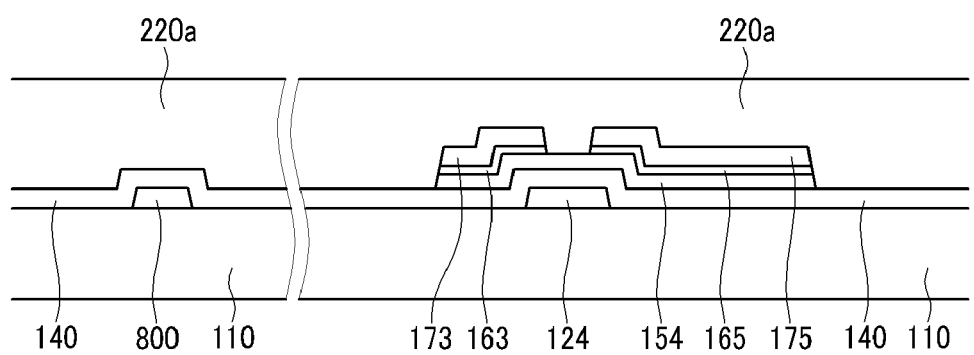
FIG. 4 to FIG. 7 are cross-sectional views of an exemplary embodiment of a manufacturing method of the LCD of FIG. 2 and FIG. 3.

As shown in FIG. 4, the gate line 121 including the gate electrode 124, the align key 800, a gate insulating layer 140, the semiconductor 154, the ohmic contact layers 163 and 165, the data line 171 including the source electrode 173, and the drain electrode 175 are formed on the first insulation substrate 110.

The align key 800 may be formed in a same layer as the gate electrode 124, and be positioned outside of a edge of the TFT array panel 100 (FIG. 1). The gate insulating layer 140 is formed over both the gate electrode 124 and the align key 800. Advantageously, since the align key 800 may be formed in substantially a same layer as the gate electrode 124, an additional process or material is not required to form the align key.

A light blocking layer 220a is coated over a portion of an upper surface of the gate insulating layer 140, upon which the data line 171 and the drain electrode 175 are previously formed.

In this case, the align key 800 is formed of a same material as the gate line 121, and the light blocking layer 220a includes carbon black at less than about 7 wt %. In addition, the light blocking layer 220a may include only an organic black material, such as perylene black or aniline black, instead of including carbon black.

Figure 5:
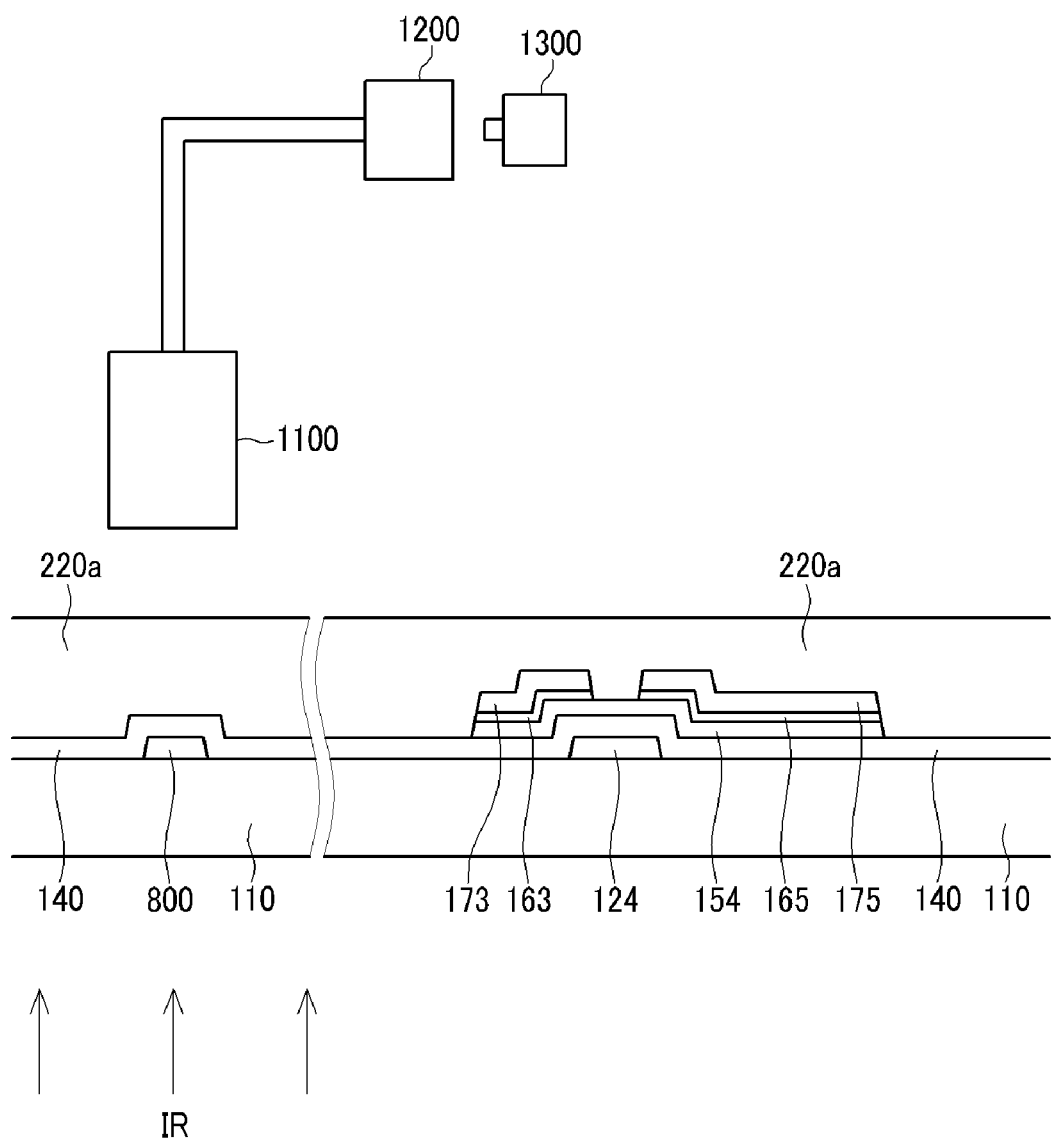

As shown in FIG. 5, an infrared ray IR having a wavelength of more than 1000 nm is transmitted from a rear side of the first insulation substrate 110, such that the align key 800 can be detected and recognized. Since the light blocking layer 220a includes carbon black, such as at a level less than about 7 wt %, infrared ray transmittance of the light blocking layer 220a is greater than about 60%, optical density of the light blocking layer 220a is greater than about 3.0. The infrared ray IR transmitted completely through the first substrate 110 and through the light blocking layer 220a is received by an objective lens 1100 and detected by an optical unit 1200. The align key 800 is recognized with an infrared ray recognition camera 1300, communicatively and functionally coupled to both the objective lens 1100 and the optical unit 1200.

In this case, it is more preferable to transmit an infrared ray having a wavelength of about 1500 nm or more.

Since the infrared ray transmittance of the light blocking layer 220a is greater than about 60%, the align key 800 coated with the light blocking layer 220a is recognized by transmitting the infrared ray, so that a precise exposure location of the light blocking layer 220a can be determined during manufacturing of the LCD.

Figure 6:
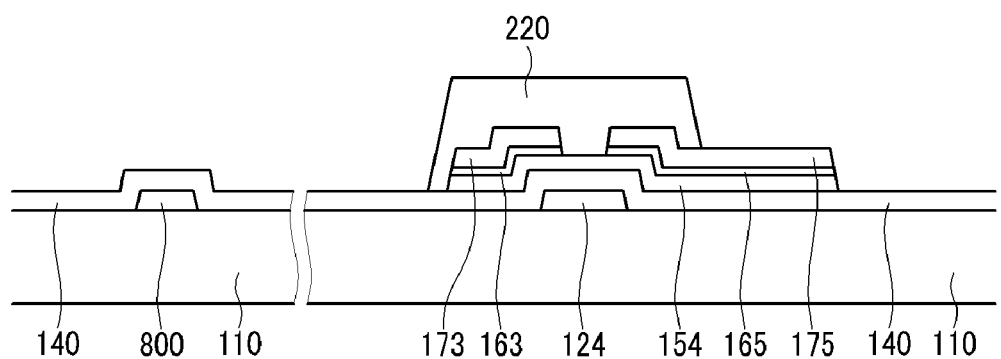

As shown in FIG. 6, the light blocking member 220 is formed on the gate line 121 and the data line 171 by exposing and developing the light blocking layer 220a.

Figure 7:
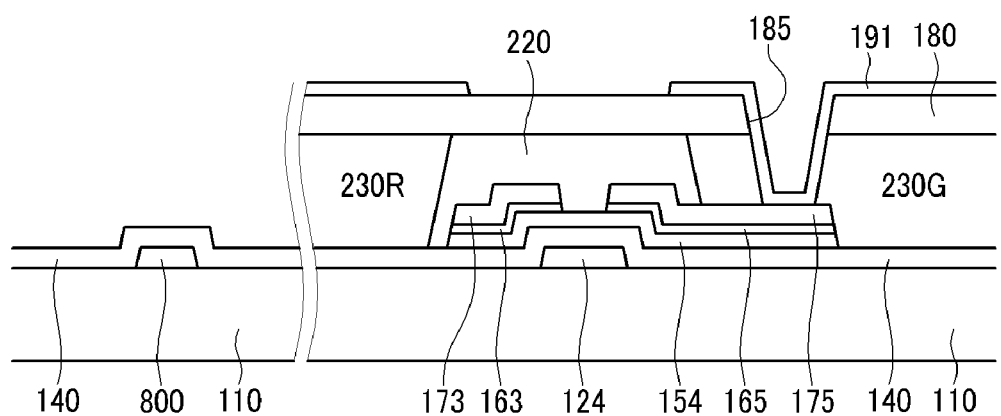

As shown in FIG. 7, after forming the color filters 230R, 230G, and 230B in each region partitioned by the light blocking member 220, the passivation layer 180 is formed on the color filters 230R, 230G, and 230B and the light blocking member 220. The contact hole 185 exposing the drain electrode 175 is formed in the passivation layer 180 and the color filters 230R, 230G, and 230B.

The pixel electrode 191 electrically connected to the drain electrode 175 through the contact hole 185, is formed on the passivation layer 180.

The common electrode panel 200 is formed to include the common electrode 270 formed on the insulation substrate 210.

After disposing liquid crystal 3 on one of the formed TFT array panel 100 and the common electrode panel 200, the TFT array panel and the common electrode panel 100 and 200 are assembled to face each other, being opposed to each other with respect to the liquid crystal layer 3.

While this invention has been described in connection with what is considered to be practical exemplary embodiments, it is to be understood that the invention is not limited to the disclosed exemplary embodiments, but, on the contrary, is intended to cover various modifications and equivalent arrangements included within the spirit and scope of the appended claims In the illustrated exemplary embodiments, a liquid crystal display is disclosed, but the present invention can be applied to several display devices including a spacer.

What is claimed is:

1. A manufacturing method of a liquid crystal display ("LCD"), the method comprising:
    forming an align key including metal on a substrate;
    coating a light blocking layer overlapping the align key;
    transmitting an infrared ray thought the light blocking layer on the align key;
    recognizing the align key by transmitting the infrared ray to the align key and the light blocking layer; and
    forming a light blocking member by exposing and developing the light blocking layer.

2. The manufacturing method of claim 1, wherein a wavelength of the infrared ray is about 1000 nanometers (nm) or more.

3. The manufacturing method of claim 2, wherein infrared ray transmittance of the light blocking layer is greater than about 60% and optical density of the light blocking layer is greater than about 3.0.

4. The manufacturing method of claim 3, wherein the light blocking layer includes carbon black at less than about 7 wt %.

5. The manufacturing method of claim 3, wherein the light blocking layer includes an organic black material.

6. The manufacturing method of claim 1, wherein a wavelength of the infrared ray is about 1500 nanometers (nm) or more.

7. A manufacturing method of a liquid crystal display ("LCD"), the method comprising:
    forming the light blocking layer including carbon black at less than about 7 wt % on a first substrate.

8. A liquid crystal device ("LCD") comprising:
    a substrate; and
    a light blocking member,
    wherein the light blocking member has infrared ray transmittance of greater than about 60% and optical density of greater than about 3.0.

9. The LCD of claim 8, wherein a metal layer is under the light blocking member.

10. The LCD of claim 9, wherein a wavelength of the infrared ray is about 1000 nanometers (nm) or more.

11. The LCD of claim 8, wherein the light blocking member includes carbon black at less than about 7 wt %.

12. The LCD of claim 11, wherein the light blocking member includes an organic black material.

13. The LCD of claim 12, wherein the light blocking member includes a perylene black or an aniline black.

14. The LCD of claim 13, wherein a wavelength of the infrared ray is about 1500 nanometers (nm) or more.

* * * * *